(12) United States Patent
Kambaloor et al.

(10) Patent No.: US 11,048,606 B2
(45) Date of Patent: Jun. 29, 2021

(54) SYSTEMS AND METHODS FOR COMPUTING AND EVALUATING INTERNET OF THINGS (IOT) READINESS OF A PRODUCT

(71) Applicant: Tata Consultancy Services Limited, Mumbai (IN)

(72) Inventors: Guruprasad Nagaraja Kambaloor, Bangalore (IN); Chethan Prabhudeva, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 477 days.

(21) Appl. No.: 16/119,548

(22) Filed: Aug. 31, 2018

(65) Prior Publication Data

US 2019/0073286 A1    Mar. 7, 2019

(30) Foreign Application Priority Data

Sep. 2, 2017  (IN) .............................. 201721031168

(51) Int. Cl.
| | |
|---|---|
| G06F 11/34 | (2006.01) |
| G06Q 10/00 | (2012.01) |
| G06N 20/00 | (2019.01) |
| G06F 11/30 | (2006.01) |
| G06Q 30/02 | (2012.01) |

(52) U.S. Cl.
CPC ...... *G06F 11/3428* (2013.01); *G06F 11/3006* (2013.01); *G06F 11/3409* (2013.01); *G06N 20/00* (2019.01); *G06Q 10/00* (2013.01); *G06Q 30/0201* (2013.01)

(58) Field of Classification Search
CPC ............ G06F 11/3006; G06F 11/3409; G06F 11/3428; G06N 20/00; G06Q 10/00; G06Q 30/0201
See application file for complete search history.

(56) References Cited

U.S. PATENT DOCUMENTS 10,348,570 B1 *  7/2019  Hegrat ................ H04L 41/0893
10,409,589 B2 *  9/2019  Rihani ...................... G06F 8/71
10,691,450 B2 *  6/2020  Jose .......................... G06F 8/60
(Continued)

*Primary Examiner* — June Y Sison
(74) *Attorney, Agent, or Firm* — Finnegan, Henderson, Farabow, Garrett & Dunner, LLP

(57) ABSTRACT

Systems and methods for computing and evaluating internet of things (IoT) readiness of a product. The traditional systems and methods provide for the IoT maturity check methodologies but they are based more upon cultural view point rather than on an accurate quantified assessment. Embodiments of the present disclosure provide for computing and evaluating the IoT readiness of the product by providing for a set of information on a plurality of IoT compatible products and target IoT integration platform and infrastructure for configuring and connecting the plurality IoT compatible products, computing and assigning a set of scores to the plurality IoT compatible products using a scoring engine module, computing revenue potential and one or more optimal methods of integrating and deploying the plurality of IoT compatible products on a comparison of the set of assigned scores, the performance potential and the potential revenue value of the plurality of IoT compatible products.

6 Claims, 4 Drawing Sheets

(56) References Cited

U.S. PATENT DOCUMENTS

| | | | |
|---|---|---|---|
| 10,805,232 B2 * | 10/2020 | Savov | H04L 47/781 |
| 2004/0172321 A1 * | 9/2004 | Vemula | G06Q 10/06 |
| | | | 705/7.24 |
| 2010/0125473 A1 | 5/2010 | Tung et al. | |
| 2014/0279201 A1 | 9/2014 | Iyoob et al. | |
| 2014/0351790 A1 * | 11/2014 | Ghose | G06F 8/36 |
| | | | 717/120 |
| 2017/0006135 A1 * | 1/2017 | Siebel | H04L 69/40 |
| 2019/0114570 A1 * | 4/2019 | Prasad | G06Q 10/067 |
| 2019/0213893 A1 * | 7/2019 | Roy | B64C 39/024 |
| 2019/0243933 A1 * | 8/2019 | Roemerman | G06N 20/20 |
| 2020/0210862 A1 * | 7/2020 | Banerjee | G06F 16/2448 |
| 2020/0310394 A1 * | 10/2020 | Wouhaybi | H04L 67/1048 |
| 2020/0334730 A1 * | 10/2020 | Westlake | G06N 20/00 |

* cited by examiner

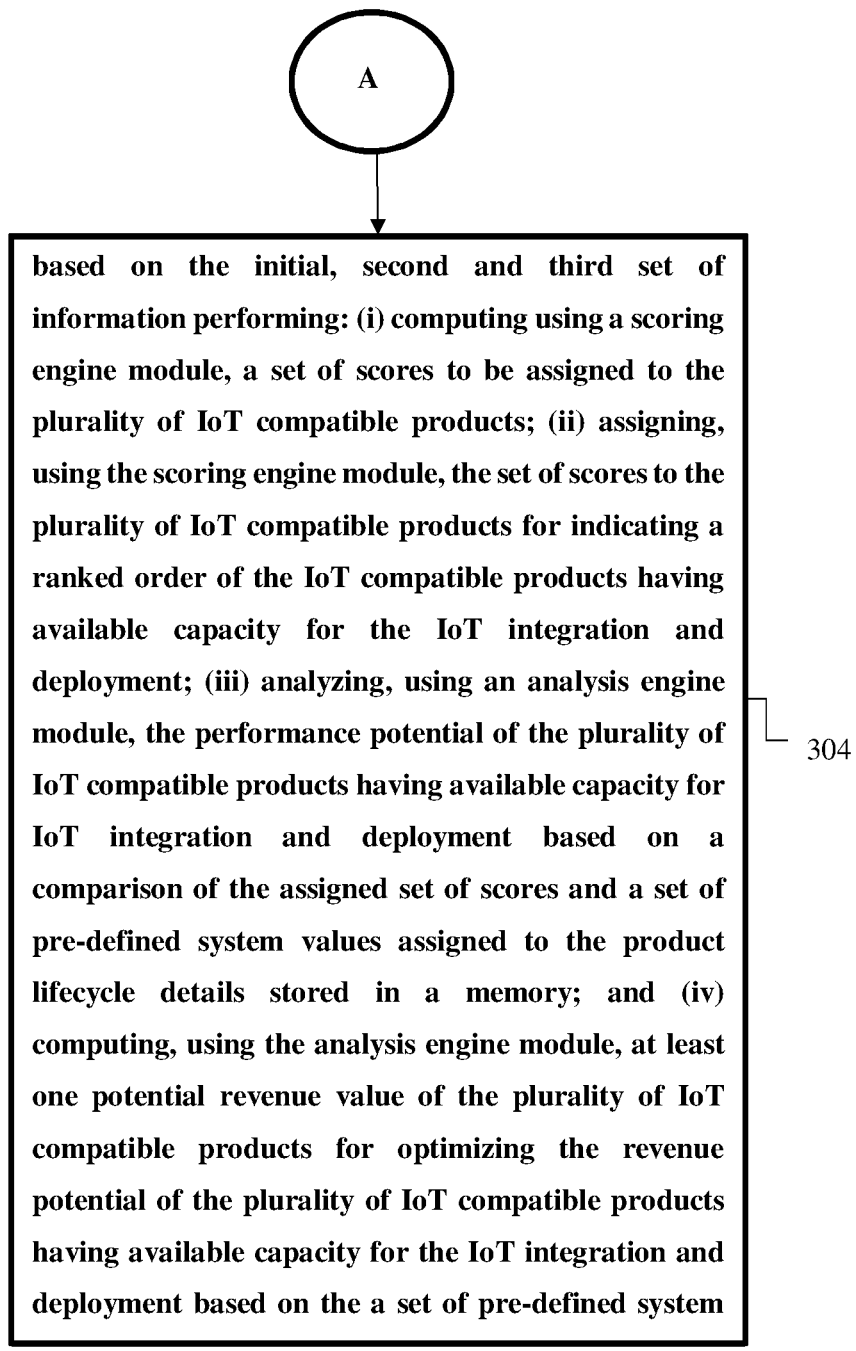

based on the initial, second and third set of information performing: (i) computing using a scoring engine module, a set of scores to be assigned to the plurality of IoT compatible products; (ii) assigning, using the scoring engine module, the set of scores to the plurality of IoT compatible products for indicating a ranked order of the IoT compatible products having available capacity for the IoT integration and deployment; (iii) analyzing, using an analysis engine module, the performance potential of the plurality of IoT compatible products having available capacity for IoT integration and deployment based on a comparison of the assigned set of scores and a set of pre-defined system values assigned to the product lifecycle details stored in a memory; and (iv) computing, using the analysis engine module, at least one potential revenue value of the plurality of IoT compatible products for optimizing the revenue potential of the plurality of IoT compatible products having available capacity for the IoT integration and deployment based on the a set of pre-defined system — 304

FIG. 3B

SYSTEMS AND METHODS FOR COMPUTING AND EVALUATING INTERNET OF THINGS (IOT) READINESS OF A PRODUCT

PRIORITY CLAIM

This U.S. patent application claims priority under 35 U.S.C. § 119 to: India Application No. 201721031168, filed on Sep. 2, 2017. The entire contents of the aforementioned application are incorporated herein by reference.

TECHNICAL FIELD

The present application generally relates to the field of computing and evaluating Internet of Things (IoT) readiness. More particularly, the present application relates to systems and methods for computing and evaluating Internet of Things (IoT) readiness of a product.

BACKGROUND

Internet of Things (IoT) systems usually consist of constrained devices like sensors that allow communication over wireless and wired networks and usually this wireless communication network is also constrained in terms of bandwidth. The IoT has metamorphosed over the last few years. The IoT, from eye-wear to cars and smart-watches, is spreading its wings as the technology behind it matures. Connecting various types of electronic devices together for a great experience in the day-to day activities is stated to be the ultimate objective of TOT. In the future, its applications will no doubt impact industry, urban development, healthcare, agriculture and other major ecosystems. While the IoT can lead to large scale improvements, some technical, legal, and economic aspects have to be dealt with carefully. For example, from a technical aspect, new software is required to efficiently analyze the myriad amount of data that will be generated by thousands of IoT sensors. In addition, internet connectivity must be economically viable, stable, and pervasive, and should comprise innovative routing algorithms for error-free data transfer. Similarly, a well-functioning and a well-defined device interoperability can encourage innovation and provide efficiencies for the IoT device manufacturers, increasing the overall economic value of the market. Furthermore, the implementation of existing standards and development of new open standards where necessary help lower barriers to entry, facilitate new business models, and build economies of scale.

The IoT readiness assessment may comprise of (but not limited to) assessing whether a device, a plant or any other product is ready for integrating and deploying into an IoT platform, whether the IoT platform is compatible to integrate and deploy hundreds of thousands of IoT based products or devices, assessing the risks associated with the deployment and integration of each of the IoT based product, cost involved in initial deployment and maintenance, assessing the number of transactions and users the platform and the integrated devices may support. Further, working through the IoT vision can be challenging and often involves getting the users or people involved in the process up to speed with the opportunities offered by the IoT technology and how it can be used to enhance products and/or create services. Also, the IoT vision needs to be continually enhanced to stay relevant. Thus, the IoT readiness assessment may face hundreds of challenges which may include information security challenges (like malicious codes, denial-of-service attacks), designing the IoT devices with software upgrade facilities, cloud computing architecture designing etc. Therefore, identification of the IoT compatible products to be integrated or deployed, the IoT platform robustness, the IoT security concerns, the cost involved must be assessed with a high level of accuracy based upon an accurate quantification of a number of factors. The traditional systems and methods provide for the IoT maturity check methodologies but they are based more upon cultural view point rather than on an accurate quantified assessment.

Therefore, there is a need for a technology that provides for an objective assessment methodology which provides a framework to collect, assess and rate devices, things or plants from multiple perspectives and uses that information to provide a roadmap for the IoT implementation based upon an accurate assessment of multiple parameters. Further, the technology must be able to quantify and assess with a high level of accuracy, inter-alia, the security of the implemented IoT architecture (for example, identifying and rating weak databases that may pose privacy challenges) or the communication constrained scenarios (for example, how many devices have less computational power or which of the wireless networks provide much lower bandwidth).

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

Systems and methods of the present disclosure enable computing and evaluating Internet of Things (IoT) readiness of a product. In an embodiment of the present disclosure, there is provided a method for computing and evaluating Internet of Things (IoT) readiness of a product, the method comprising: obtaining, by one or more hardware processors, an initial set of information on a plurality of IoT compatible products based on a product lifecycle details stored in a memory; generating, by the one or more hardware processors, a second set of information on a target IoT integration platform and infrastructure for configuring and connecting the plurality IoT compatible products based on the initial set of information; based on the second set of information performing: (i) generating, using an IoT platform recommendation module, a third set of information characterizing integration and deployment of the plurality of IoT compatible products within a current operational IoT infrastructure; (ii) identifying, using the IoT platform recommendation module, the plurality of IoT compatible products having available capacity for an IoT integration and deployment; and (iii) determining, using the one or more hardware processors, a number of transaction requests to be processed by the IoT compatible products having the available capacity for an IoT integration and deployment; based on the initial, second and third set of information performing: (i) computing, using a scoring engine module, a set of scores to be assigned to the plurality of IoT compatible products; (ii) assigning, using the scoring engine module, the set of scores to the plurality of IoT compatible products for indicating a ranked order of the IoT compatible products having available capacity for the IoT integration and deployment; (iii) analyzing, using an analysis engine module, the performance potential of the plurality of IoT compatible products having available capacity for IoT integration and deployment based on a comparison of the assigned set of scores and a set of pre-defined system values assigned to the product lifecycle details stored in a memory; and (iv) computing, using a benchmark learning engine module, at least one potential revenue value of the plurality of IoT compatible products for optimizing the revenue potential of the plurality of IoT compatible products having available capacity for the IoT integration and deployment based on the set of pre-defined system values assigned to the product lifecycle details; determining, using the IoT platform recommendation module, an estimated number of concurrent users to be supported by the integration and deployment of the plurality of IoT compatible products based on a comparison of the target IoT integration platform and infrastructure for configuring and connecting the plurality IoT compatible products and the number of transaction requests to be processed by the IoT compatible products; identifying, using the IoT platform recommendation module and the whitespace analyzer module, one or more optimal methods of integrating and deploying the plurality of IoT compatible products on a comparison of the set of assigned scores, the performance potential and the potential revenue value of the plurality of IoT compatible products; determining, based on the analysis of the performance potential and the computed potential revenue value, an improvement score characterizing a degree of potential improvement in integrating and deploying the plurality of IoT compatible products, wherein determining the improvement score includes using the optimal methods of integrating and deploying the plurality of IoT compatible products and the analysis of the performance potential and the computed potential revenue value; and determining the improvement score by performing, using the scoring engine module a correlation of the optimal methods of integrating and deploying the plurality of IoT compatible products with the analysis of the performance potential and the computed potential revenue value for performing further analysis to identify one or more alternate optimal methods of integrating and deploying the plurality of IoT compatible products.

In an embodiment of the present disclosure, there is provided a system for computing and evaluating Internet of Things (IoT) readiness of a product, the system comprising one or more processors; one or more data storage devices operatively coupled to the one or more processors and configured to store instructions configured for execution by the one or more processors to: obtain, by one or more hardware processors, an initial set of information on a plurality of IoT compatible products based on a product lifecycle details stored in a memory; generate, by the one or more hardware processors, a second set of information on a target IoT integration platform and infrastructure for configuring and connecting the plurality IoT compatible products based on the initial set of information, based on the second set of information perform: (i) generate, using an IoT platform recommendation module, a third set of information characterizing integration and deployment of the plurality of IoT compatible products within a current operational IoT infrastructure; (ii) identify, using the IoT platform recommendation module, the plurality of IoT compatible products having available capacity for an IoT integration and deployment; and (iii) determine, using the one or more hardware processors, a number of transaction requests to be processed by the IoT compatible products having the available capacity for an IoT integration and deployment; based on the initial, second and third set of information perform: (i) compute, using a scoring engine module, a set of scores to be assigned to the plurality of IoT compatible products; (ii) assign, using the scoring engine module, the set of scores to the plurality of IoT compatible products for indicating a ranked order of the IoT compatible products having available capacity for the IoT integration and deployment; (iii) analyze, using an analysis engine module, the performance potential of the plurality of IoT compatible products having available capacity for IoT integration and deployment based on a comparison of the assigned set of scores and a set of pre-defined system values assigned to the product lifecycle details stored in a memory; and (iv) compute, using the analysis engine module, at least one potential revenue value of the plurality of IoT compatible products for optimizing the revenue potential of the plurality of IoT compatible products having available capacity for the IoT integration and deployment based on the a set of pre-defined system values assigned to the product lifecycle details; determine, using the IoT platform recommendation module, an estimated number of concurrent users to be supported by the integration and deployment of the plurality of IoT compatible products based on a comparison of the target IoT integration platform and infrastructure for configuring and connecting the plurality IoT compatible products and the number of transaction requests to be processed by the IoT compatible products; identify, using the IoT platform recommendation module and the whitespace analyzer module, one or more optimal methods of integrating and deploying the plurality of IoT compatible products on a comparison of the set of assigned scores, the performance potential and the potential revenue value of the plurality of IoT compatible products; determine an improvement score characterizing a degree of potential improvement in integrating and deploying the plurality of IoT compatible products based on the analysis of the performance potential and the computed potential revenue value, wherein determining the improvement score includes using the optimal methods of integrating and deploying the plurality of IoT compatible products and the analysis of the performance potential and the computed potential revenue value; and determine the improvement score by performing, using the scoring engine module, a correlation of the optimal methods of integrating and deploying the plurality of IoT compatible products with the analysis of the performance potential and the computed potential revenue value for performing further analysis to identify one or more alternate optimal methods of integrating and deploying the plurality of IoT compatible products.

In yet another embodiment, provides one or more non-transitory machine readable information storage mediums comprising one or more instructions, which when executed by one or more hardware processors perform actions includes providing a system for computing and evaluating Internet of Things (IoT) readiness of a product, the system comprising one or more processors; one or more data storage devices operatively coupled to the one or more processors and configured to store instructions configured for execution by the one or more processors to: obtain, by one or more hardware processors, an initial set of information on a plurality of IoT compatible products based on a product lifecycle details stored in a memory; generate, by the one or more hardware processors, a second set of information on a target IoT integration platform and infrastructure for configuring and connecting the plurality IoT compatible products based on the initial set of information, based on the second set of information perform: (i) generate, using an IoT platform recommendation module, a third set of information characterizing integration and deployment of the plurality of IoT compatible products within a current operational IoT infrastructure; (ii) identify, using the IoT platform recommendation module, the plurality of IoT compatible products having available capacity for an IoT integration and deployment; and (iii) determine, using the one or more hardware processors, a number of transaction requests to be processed by the IoT compatible products having the available capacity for an IoT integration and deployment; based on the initial, second and third set of information perform: (i) compute, using a scoring engine module, a set of scores to be assigned to the plurality of IoT compatible products; (ii) assign, using the scoring engine module, the set of scores to the plurality of IoT compatible products for indicating a ranked order of the IoT compatible products having available capacity for the IoT integration and deployment; (iii) analyze, using an analysis engine module, the performance potential of the plurality of IoT compatible products having available capacity for IoT integration and deployment based on a comparison of the assigned set of scores and a set of pre-defined system values assigned to the product lifecycle details stored in a memory; and (iv) compute, using the analysis engine module, at least one potential revenue value of the plurality of IoT compatible products for optimizing the revenue potential of the plurality of IoT compatible products having available capacity for the IoT integration and deployment based on a set of pre-defined system values assigned to the product lifecycle details; determine, using the IoT platform recommendation module, an estimated number of concurrent users to be supported by the integration and deployment of the plurality of IoT compatible products based on a comparison of the target IoT integration platform and infrastructure for configuring and connecting the plurality IoT compatible products and the number of transaction requests to be processed by the IoT compatible products; identify, using the IoT platform recommendation module and the whitespace analyzer module, one or more optimal methods of integrating and deploying the plurality of IoT compatible products on a comparison of the set of assigned scores, the performance potential and the potential revenue value of the plurality of IoT compatible products; determine an improvement score characterizing a degree of potential improvement in integrating and deploying the plurality of IoT compatible products based on the analysis of the performance potential and the computed potential revenue value, wherein determining the improvement score includes using the optimal methods of integrating and deploying the plurality of IoT compatible products and the analysis of the performance potential and the computed potential revenue value; and determine the improvement score by performing, using the scoring engine module, a correlation of the optimal methods of integrating and deploying the plurality of IoT compatible products with the analysis of the performance potential and the computed potential revenue value for performing further analysis to identify one or more alternate optimal methods of integrating and deploying the plurality of IoT compatible products.

It is to be understood that both the foregoing general description and the following detailed description are exemplary and explanatory only and are not restrictive of the invention, as claimed.

BRIEF DESCRIPTION OF THE DRAWINGS

The embodiments herein will be better understood from the following detailed description with reference to the drawings, in which:

FIGS. 3A & 3B is a flowchart illustrating the steps involved for computing and evaluating Internet of Things (IoT) readiness of a product according to an embodiment of the present disclosure;

DETAILED DESCRIPTION OF THE EMBODIMENTS

Figure 1:
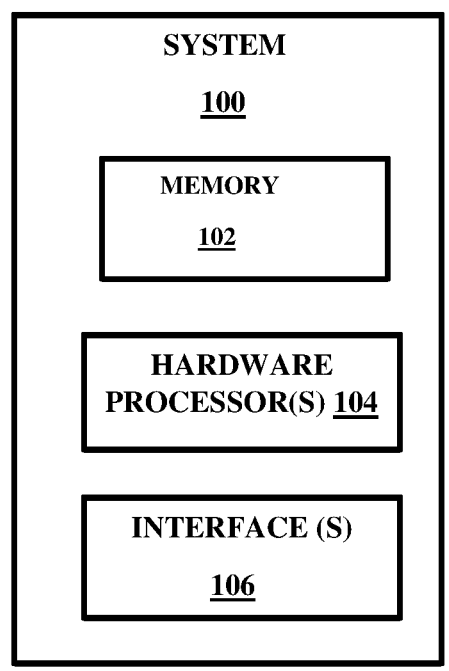
FIG. 1 illustrates a block diagram of a system for computing and evaluating Internet of Things (IoT) readiness of a product according to an embodiment of the present disclosure.

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments of the present disclosure provides systems and methods for computing and evaluating Internet of Things (IoT) readiness of a product. The IoT systems usually consist of constrained devices like sensors that allow communication over wireless and wired networks and usually this wireless communication network is also constrained in terms of bandwidth. The IoT offers the potential to exchange information and insights in real time, across a connected network. It utilizes cost-effective, low power sensors to effectively track and transmit monitored parameters for analysis, to drive timely decision making. As organizations across industries begin to reorient their business models to realize the IoT potential, the need for engineering support is on the rise. The IoT is both an opportunity and a threat to most companies. While it represents tremendous potential as a source of new revenue streams and efficiency gains, it also opens companies to a host of new risks that they should be preparing for today. Therefore, assessing IoT readiness and maturity of a product becomes absolutely critical. However, the IoT assessment may face multiple challenges which may include information security challenges (like malicious codes, denial-of-service attacks), designing the IoT devices with software upgrade facilities, cloud computing architecture designing etc. Therefore, identification of the IoT compatible products to be integrated or deployed, the IoT platform robustness, the IoT security concerns, the cost involved must be assessed with a high level of accuracy based upon an accurate quantification of a number of factors. The traditional systems and methods provide for the IoT maturity check methodologies but they are based more upon cultural view point rather than on an accurate quantified assessment. Therefore, there is a need for a technology that provides for an objective assessment methodology which provides a framework to collect, assess and rate devices or things from multiple perspectives and uses that information to provide a roadmap for the IoT implementation based upon an accurate assessment of multiple parameters.

Referring now to the drawings, and more particularly to FIG. 1 through FIGS. 3A & 3B, where similar reference characters denote corresponding features consistently throughout the figures, there are shown preferred embodiments and these embodiments are described in the context of the following exemplary system and/or method.

FIG. 1 illustrates an exemplary block diagram of a system 100 for computing and evaluating Internet of Things (IoT) readiness of a product. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 102 may further include a set of information or various details on a plurality of IoT compatible products which are required to be assessed for IoT readiness. The set of information or details may be based on lifecycle details of the plurality of IoT compatible products. For example, the memory 102 may include details on the growth, revenue generated, existing market value and channels of distribution of the plurality of IoT compatible products to be assessed for IoT readiness.

Figure 2:
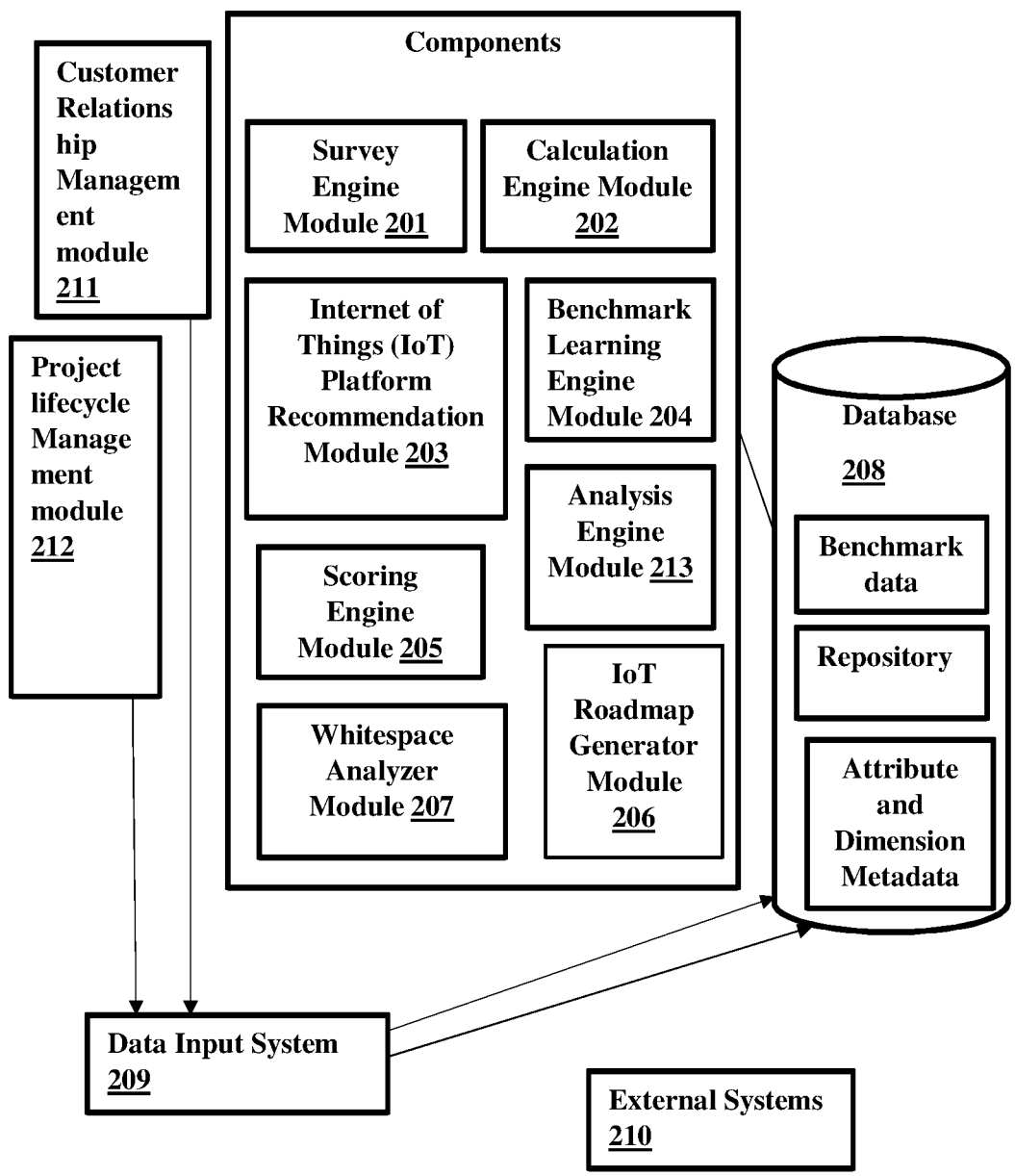
FIG. 2 is an architecture illustrating the components of a system for computing and evaluating Internet of Things (IoT) readiness of a product according to an embodiment of the present disclosure.

According to an embodiment of the present disclosure, referring to FIG. 2, the architecture and components of the system for computing and evaluating Internet of Things (IoT) readiness of a product may now be considered in detail. The system 100 architecture comprises of a survey engine module 201 comprises of set of information obtained through online and offline surveys from a plurality of user and customers with respect to one or more IoT compatible products for which the IoT readiness is to be computed, requirements of the plurality of user and customers from the IoT compatible products deployment and integration and details on other associated set of parameters. A calculation engine module 202 performs calculations involved in computing and evaluating the IoT readiness of a product. An IoT platform recommendation module 203 performs a selection of the plurality of IoT products having available capacity for an IoT integration and deployment from amongst the plurality of IoT compatible products or devices initially identified. The IoT platform recommendation module 203 and a whitespace analyzer module 207 may also assist in determining one or more optimal methods of integrating and deploying the plurality of IoT compatible products. A benchmark learning engine module 204 performs an ingestion and normalization of the set of quantitative and non-quantitative inputs to produce a filtered set of information which may include deployable costs, usage of each of the product from the set of historical products, returns associated with of the product from the set of historical products in ascending order, acceptance or rejection decision for each of the product etc. The benchmark learning engine module 204 may also perform the relevant classifications of the set of filtered information in a pipelined manner in accordance with the user requirements. A scoring engine module 205 performs computation and assigning of a set of scores to be assigned to the plurality of IoT compatible products while computing and evaluating the IoT readiness of a product. The scoring engine module 205 also performs assigning a set of weightages to the plurality of IoT compatible products while performing the computation and assigning of the set of scores. An IoT roadmap generator module 206 obtains a set of inputs from other modules (not shown in FIG. 2) for evaluating relative ease and difficulty of the IoT the plurality of IoT compatible products of the plurality of IoT compatible products. The whitespace analyzer module 207 along with the IoT platform recommendation module 203 performs determining one or more optimal methods of integrating and deploying the plurality of IoT compatible products. A database 208 may comprise of a benchmark data on a set of historical products identical to the plurality of IoT compatible product to be evaluated for readiness, a set of metadata and a repository for storing data. A data input system 209 may involve a combination of machines, users or processes that performs a processing on a set of inputs to produce as set of outputs. The set of inputs and outputs may be data, facts, information or any combination of these. An external systems 210 may comprise of a plurality data sources, for example, an oracle database that may be used as a solution. A customer relationship management module 211 comprises a set of technologies and strategies for improving business-customer relations and may comprise a set of information on customer account management, sales reporting etc. A product lifecycle management module 212 may comprise of lifecycle details of the plurality of IoT compatible products such as design, process or a combination of strategic processes to reduce the cost of getting a product to market, efficiently scale to meet market etc. An analysis engine module 213, inter-alia, analyzes potential (in quantitative and non-quantitative terms) of the plurality of IoT compatible products having available capacity for the IoT integration and deployment.

Figure 3A:
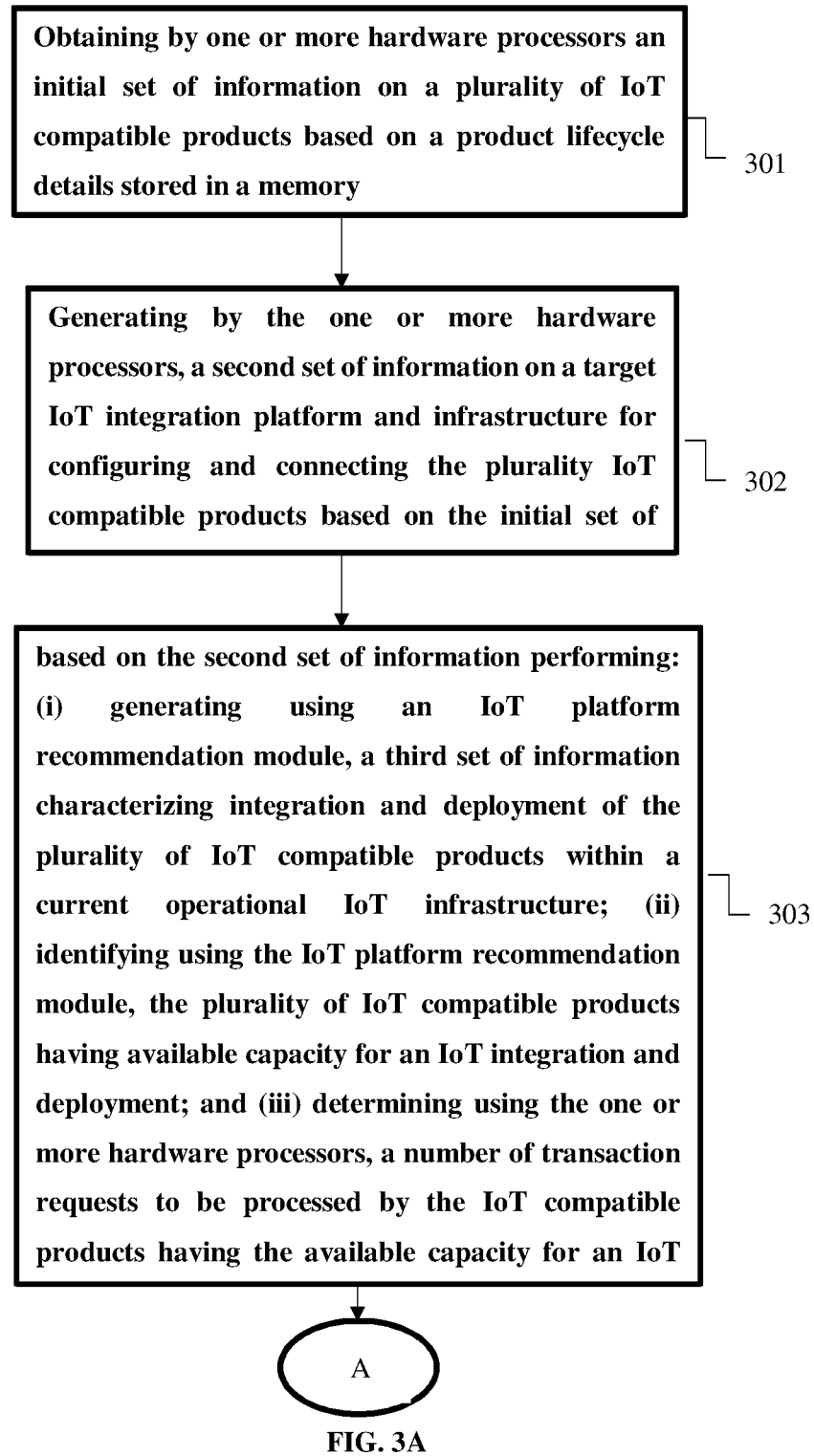

FIGS. 3A &3B, with reference to FIGS. 1 and 2, illustrates an exemplary flow diagram of a method for computing and evaluating Internet of Things (IoT) readiness of a product according to an embodiment of the present disclosure. In an embodiment the system 100 comprises one or more data storage devices of the memory 102 operatively coupled to the one or more hardware processors 104 and is configured to store instructions for execution of steps of the method by the one or more processors 104. The steps of the method of the present disclosure will now be explained with reference to the components of the system 100 as depicted in FIG. 1 and the flow diagram. In the embodiments of the present disclosure, the hardware processors 104 when configured the instructions performs one or more methodologies described herein. In an embodiment of the present disclosure, at step 301, the one or more hardware processors 104 obtains an initial set of information on a plurality of IoT compatible products based on a product lifecycle details.

The initial set of information may be obtained through surveys or technical discussions with one or more users who may have an interest in deployment or integration of IoT compatible products. The information may further be also obtained through the project lifecycle management (PLM) module 212 or a customer relationship management (CRM) module 211 which contain a set of information or details on the project lifecycle management and the customer relationship management with respect to one or more products that may have the IoT deployment and configuration compatibility. It may be noted that the set of information or details on the project lifecycle management and the customer relationship management of the one or more products may also be obtained from the memory 102 of the system 100. The information acts an input in preparing IoT readiness assessment of the one or more products that may have the IoT deployment and configuration compatibility. The one or more devices may further include one or more machines, devices, plants (manufacturing or other) or any combination thereof within an enterprise that may be assessed for the IoT readiness based upon the user inputs and may not be construed a limiting the scope of the present disclosure to these things or devices only. At step 301, the one or more hardware processors 104 further groups of the one or more products identified for the IoT readiness assessment based upon the user inputs, customer requirements, the one or more products or type, category, cost of operations, return on investment or any combination thereof. The information on the business drivers that necessities the IoT deployment or integration, for example improving customer satisfaction or serviceability, may then be collected from the users.

The determination of the level at which the IoT readiness assessment is to be computed may then be performed by the one or more hardware processors 104. The IoT readiness assessment may be performed at products level, customer level or commonly across all the levels and any existing IoT compatible products within an enterprise. Finally, at step 301, the one or more hardware processors 104 obtains information on technical or non-technical parameters of interest with respect to the IoT compatible products. The parameters obtained may then be grouped into various dimensions or categories like technicality, usage or business but not limited to these only. The details on the various dimensions or categories like technicality, usage or business requirements may further be obtained through the users or customer inputs, administration guides or design documents, challenges faced or the IoT compatible products or devices feedback. The details with respect to the various dimensions or categories may not construed as limiting the scope of the present disclosures to any particular dimension, category or attributed thereof and may further include any further attributes, dimensions or any combinations thereof.

At step 302, the one or more hardware processors 104 generates a second set of information on a target IoT integration platform and infrastructure for configuring and integrating the plurality of IoT compatible products based upon the initial set of information obtained at step 301. The information on the target IoT platform may further be generated based upon the user inputs on the IoT platform's capabilities and one or more supporting applications, uniqueness of the IoT platform's solution, the ability of the plurality IoT compatible products to be integrated on the target IoT platform to collect big data around products, workflows, business and customers, creating one or more IoT dashboards and making them customizable for automating interactions between the one or more IoT compatible products or devices, one or more applications, data or control of one or more smart devices to be integrated on the target IoT platform.

The IoT platform information generation may comprise determining: (i) hardware needs such as a plurality of sensor, devices, compounds, remote controls and asset trackers etc. to be integrated and deployed for collecting data (for example, a smart meter monitoring and data analysis for an enterprise), (ii) connectivity requirements such as a method of transmitting all the data collected by the hardware to cloud or method to receive commands from the cloud (for example, when to switch off power using the smart meter monitoring), (iii) software requirements such as one or more software to be hosted in the cloud for analyzing and processing of the data (for example, the smart meter billed data) and (iv) making one or more decisions and finally determining user interface requirements for establishing a communication between the users and the IoT compatible devices or products (for example, a web application with a dashboard which displays power usage and advises the users when to turn off the power). Further, the information on the target IoT platform may be considered based upon how does the target IoT platform monitor and control one or more IoT compatible products or devices, handling of the IoT security, compatibility of the target IoT platform with one or more IoT protocols, one or more cloud storage options to be selected, duration of IT project cycles and return on capital. The information on the target IoT integration platform and infrastructure may finally be generated based upon the specific requirements of an enterprise (for example, whether a classification of sensor data is required, design for scalability etc.) to configure and integrate the IoT compatible products or devices, a machinery, the plants (manufacturing or other). The ease and simplicity of getting basic networking to work on one or more prototypes, getting communication to the cloud and the mobile applications are one of the essential requirements along with the security, flexibility and data intelligence that may be considered while generating the set of information on the target IoT integration platform.

At step 303, the one or more hardware processors 104 generate, based upon the second set of information, a third set of information characterizing integration and deployment of the plurality of IoT compatible products within a current operational IoT infrastructure using the IoT platform recommendation module 203. Based upon the IoT integration platform and infrastructure selected after step 302, the third set of information may further be generated with respect to streamlining the installation process of the plurality IoT compatible products or devices, support costs associated with maintenance, updates or servicing, improving the user satisfaction by reducing the applications downtime and improving server performance and simplification of the lifecycle management. However the scope of the present disclosure does not restricts the information generated characterizing integration and deployment of the plurality of IoT compatible products within the current operational IoT infrastructure to the above only and further allows including a plurality of information required to be generated for assessing the IoT readiness.

According to an embodiment of the present disclosure, based upon the information characterizing integration and deployment of the plurality of IoT compatible products and the current operational IoT infrastructure, the IoT platform recommendation module 203 may further perform a selection of a plurality of IoT products having available capacity for the IoT integration and deployment from amongst the plurality of IoT compatible products or devices initially identified. The final selection of the IoT products having the available capacity for the IoT integration and deployment may then be performed based upon an analysis of a set of information comprising of technical readiness, business readiness and a plurality of data (for example how codes are written and may be reused), from the plurality of IoT compatible products or devices initially identified. For example, referring to tables 1, 2 and 3 below, it may be observed that there are total four IoT compatible devices initially identified for deployment and integration in the IoT platform. Amongst the identified product it may be observed that in table 1, which provides for the plurality of data, device 4 is most critical as it is customer facing and is accessed both at onsite and offshore. Referring to table 2 below, which provides for the technical readiness score and other details, it may observed that the device 4 has real-time alerts, is fully secured and scores high on technical readiness score, where the score of 5 indicates highest score and reliability while 1 indicates a very poor score and no reliability. Similarly, referring to table 3 below, which provides for the business readiness score and details, the device 4 also scores high on the business readiness score as it has a high business criticality and is a revenue generator.

Based upon the comparison and the analysis of the information generated characterizing integration and deployment of the plurality of IoT compatible products and the current operational IoT infrastructure with a plurality of data, the technical and business readiness score it may be observed that the device 4 may be securely identified to be integrated and deployed in the IoT platform infrastructure. It may be noted that scope of the present disclosure does not restricts the selection of the plurality of IoT products having available capacity for the IoT integration and deployment based upon below parameters only and may include a plurality of information from other sources and a plurality of other scores computed by different means to perform selection of the plurality of IoT products.

TABLE 1

| IoT compatible products identified | Category | Customer Facing | Location | Status |
|---|---|---|---|---|
| Device 1 | Manufacturing plant | No | Onsite | Active |
| Device 2 | Manufacturing plant | No | Onsite | Inactive |
| Device 3 | IT | No | Onsite | Active |
| Device 4 | IT | Yes | Onsite and Offshore | Active |

TABLE 2

| IoT compatible products identified | Real time alerts | Large data storage readiness | Data Quality | Security needed | Data score | Security score | Technical Readiness Score |
|---|---|---|---|---|---|---|---|
| Device 1 | Yes | No | Somewhat reliable | Yes | 2 | 1 | 2 |
| Device 2 | No | No | Non-reliable | Yes | 2 | 3 | 3 |
| Device 3 | Yes | Yes | Non-reliable | Partially secured | 3 | 4 | 4 |
| Device 4 | Yes | Yes | Highly Reliable | Already secured | 5 | 5 | 5 |

TABLE 3

| IoT compatible products identified | Business Criticality | Revenue generator | Success KPIs exist | Cost-benefit analysis | Business continuity score | Business productivity score | Business Readiness Score |
|---|---|---|---|---|---|---|---|
| Device 1 | Low | No | No | No | 2 | 1 | 1 |
| Device 2 | Low | No | No | Yes | 4 | 4 | 3 |
| Device 3 | Medium | Yes | Yes | No | 3 | 3 | 4 |
| Device 4 | High | Yes | Yes | Yes | 4 | 5 | 5 |

According to an embodiment of the present disclosure, based upon the second set of information, the one or more hardware processors 104 may determine a number of transaction requests to be processed by the IoT compatible products having the available capacity for the IoT integration and deployment. As the IoT compatible products or devices integrated on the IoT platform are expected to handle a very high volume of big data, need to support real time analytics and high frequency data ingestion, the determination of the number of requests expected to be handled becomes absolutely critical. Hence the estimation of the number of requests to be handled by the IoT compatible products or devices may be determined based upon an analysis of the user requirements, IoT platform capacity to support big data and requests, storage capacity and security features.

The estimation of the number of requests may be determined based on the number of messages the IoT compatible products may send, frequency of the messages, size of the messages and the total number of the IoT compatible products integrated and deployed in the IoT platform. For example, the number of messages the IoT compatible products may send are 10 per day, frequency of the messages is 3 times a day, the size of the messages permitted is 10 GB and the total number of the IoT compatible products integrated and deployed are 10, then the number of requests to be handled by the IoT compatible products may be 3000 approximately (obtained as a product of the number of messages the IoT compatible products may send, the frequency of the messages, the size of the messages and the total number of the IoT compatible products integrated and deployed). It may be noted that the scope of the present disclosure does not restrict the determination of the number of requests expected to be handled based upon above parameters only. The scope of the present disclosure may further permit a plurality of other parameters or the combinations or different methods of computing the number of requests to be handled by the IoT compatible products. For example, the present disclosure may permit the determination of the number of requests by including a number of failed messages or a total number of the IoT compatible products removed from the IoT platform after integration or deployment.

According to an embodiment of the present disclosure, an estimated number of concurrent users that may be supported by the integration and deployment of the plurality of IoT compatible products may be determined based upon the information generated by performing the comparison of the target IoT integration platform and infrastructure products and the number of transaction requests to be processed by the IoT compatible products. The information is provided as an input to the IoT platform recommendation module 203 for performing an analysis to further determine an estimated number of concurrent users that the IoT platform and the IoT compatible products may support. As the IoT platform and products are expected to handle billions of transactions and support a plurality or users or customer, the determination of the number of users or customers that the IoT platform may support simultaneously becomes critical.

The IoT recommendation module 203 may upon receiving the inputs, perform a comparison and analysis of the inputs received and may generate details on the number of users that the IoT integration platform may support based upon security features analysis (for example, for many users may be authenticated and assigned with a unique identifier), support costs involved in allowing high number of users in the IoT integration platform, analysis of the nature of transactions and data that the target IoT platform is expected to handle (for example, a financial data may require more analysis) and performing the comparison of what the target IoT platform may handle with the user expectations. For example, if the target IoT integration platform and infrastructure has the capacity to support 100 IoT compatible products, the number of transaction requests to be processed by the IoT compatible products is 100, the number of users expected to be on the IoT platform are 10 (based upon the inputs received from multiple sources like the users feedback, product life cycle details etc) the estimated number of concurrent users that the IoT platform and the IoT compatible products may support may be 1000 (obtained by computing a product of 100 IoT compatible products and 100 number of transaction requests divided by 10). It may be noted that the scope of the present disclosure does not restrict the determination of the estimated number of concurrent users based upon above parameters only. The scope of the present disclosure may further permit a plurality of other parameters or the combinations or different methods of computing the number of concurrent users to be handled by the IoT compatible products.

According to an embodiment of the present disclosure, at step 304, a set of scores may be assigned to the plurality of IoT compatible products or devices using the scoring engine module 205. After the plurality of IoT compatible products are identified, a set of dimensions relevant to the plurality of IoT compatible products may be identified. The set of dimensions may comprise of technical, business or financial dimensions but not limited to these. The identified set of dimensions may then be assigned a set of weights based upon their criticality on the scale of 1 to 5 using the scoring engine module 205. Similarly, the identified dimensions are assigned a set of values by the users or customers based upon the criticality of each of the dimension on the scale of 1 to 5. The identified set of dimensions and the assigned scores and values may then be given as inputs to the scoring engine module 205 for performing an analysis to produce a set of information (for example, the capacity of a device 5 or a device 6 identified for the IoT integration and deployment) and a total score corresponding and unique to each of the dimension for each of the plurality of IoT compatible products identified.

TABLE 4

| IoT compatible product identified for deployment (A) | Business dimension score (B) | Technical dimension score (C) | Ranked order (D) |
| --- | --- | --- | --- |
| Device 5 | 4.82 | 3.75 | 1 |
| Device 6 | 4.18 | 3.63 | 2 |
| Device 7 | 3.45 | 3.75 | 3 |
| Device 8 | 3.73 | 2.94 | 5 |
| Device 9 | 3.27 | 3.00 | 5 |
| Device 10 | 2.82 | 2.63 | 5 |
| Device 11 | 2.73 | 3.31 | 5 |
| Any other device | 1.55 | 3.56 | 6 |

Referring to table 4 above, a device 5 (identified as the IoT compatible) has the business dimension score of 4.82 and the technical dimension score of 3.75. Similarly, the other IoT compatible products identified for the IoT integration and deployment have been assigned the total business and technical dimension scores. For example, a device 7 has business dimension score of 3.45 and the technical dimension score of 3.75. Thus, for the plurality of IoT compatible products identified, the business dimension score and the technical dimension score may be computed. It may be noted that the scope of the present disclosure is not restricted to assigning the pre-defined set of values or scores based upon the historical data or usage or assigning the set of values or scores only the users or customers. Each of the plurality of the IoT compatible product may be assigned the set of values or scores from a plurality of other sources like vendors, hardware or software providers for IoT platform or business competitors.

According to an embodiment of the present disclosure, at step 304, the scoring engine module 205 assigns (via the one or more hardware processors 104) the set of scores computed above to the plurality of IoT compatible products for indicating a ranked order of the IoT compatible products having available capacity for the IoT integration and deployment. The set of scores for the set of identified dimensions assigned by the scoring engine module 205 may be aligned with the set of scores to each of the plurality of IoT compatible products using the one or more hardware processors 104. Based upon a set of pre-defined system rules, a rules engine (not shown in the figure) may perform an analysis and a comparison of the scores aligned by the scoring engine module 205 and further indicate the ranked order of the IoT compatible products having available capacity for the IoT integration and deployment. Referring to table 4 above, the ranked order of each of the plurality of IoT compatible products are indicate in column D. Thus, the IoT compatible products having the ranked order of 1 are to be integrated and deployed first in the IoT platform while the IoT compatible products ranking last are to be deployed later. For example, if the business dimension has a score of 4 or above computed and the technical dimension has a score of 3 or above computed, the ranked order of the IoT compatible product should be 1. Similarly, if the business dimension has a score of 3 or above computed and the technical dimension has a score of 3 or above computed the ranked order of the IoT compatible product should be 3. Referring to table 4 again, the device 5 has a ranked order of 1 and the device 7 has a ranked order of 3. Thus the device 5 may be deployed and integrated first and any other product may be deployed and integrated last in the IoT platform. It may be noted that the scope of the present disclosure is not restricted to the above set of pre-defined system rules only and may set any further set of rules or a combination of one or rules depending upon business, technical and other requirements for indicating the ranked for the plurality of IoT compatible products.

According to an embodiment of the present disclosure at step 304, a performance potential of the plurality of IoT compatible products having available capacity for the IoT integration and deployment may be analyzed by the analysis engine module 213 based on a comparison of the set of scores assigned to the each of the plurality of IoT compatible products and set of predefined system values (not shown in the table). The set of predefined system values are assigned to each of the plurality of IoT compatible products to the product lifecycle details stored in a memory. The pre-defined system values are may be assigned in accordance with the realized benefit values from a set of historical products similar to the IoT compatible products. The realized benefit values are a set of one or more computed benchmarks by performing an analysis and a comparison of the plurality of quantitative values by the one or more hardware processors 104, for example, operational efficiency achieved and targeted, net profit targeted and achieved for the set of historical products. The set of one or more computed benchmarks for each of the set of historical products may be stored in the system 100.

Based upon the comparison and analysis, a further set of quantitative values are obtained for each of the historical products. For example, device 2 which may be similar to the device 5 may have net operational efficiency of 28 percent. Thus based upon the comparison of the benchmark of 28 percent with set of scores assigned to the device 5, the analysis engine module 213 may yield an analysis that "there is a scope to perform predictive maintenance and improve serviceability" or "minimum 5 percent improvement in operational efficiency". Thus the embodiments of the present disclosure enable the system 100 (or the one or more hardware processors 104) to compute and analyze the performance potential of each of the plurality of IoT compatible products based upon the comparison of the assigned set of scores and a set of pre-defined system values. It may however be noted that the scope if the present disclosure is not restricted to computing the set of one or more benchmarks based upon the above examples only and may further take into account a plurality of factors for which the plurality of quantitative values may be computed. It may also further be noted that the scope of the present disclosure is not restricted to analyze and compute the performance potential and the predefined system values in terms of percentage only. The performance potential and the predefined system values may be computed and analyzed in terms of output, cost, storage capacity or in any other quantitative terms which may be (or are stored) in the memory 102.

According to an embodiment of the present disclosure, at step 304, at least one potential revenue value of the plurality of IoT compatible products for optimizing the revenue potential of the plurality of IoT compatible products may be computed by the benchmark learning engine module 204 based upon the set of pre-defined system values. The benchmark learning engine module 204 receives a set of quantitative and non-quantitative inputs comprising of a set of information on the set of historical products similar to the plurality of IoT compatible products, for example, performance reporting, realized benefits values, maintenance costs, sales/cost comparable values, cost/benefit analysis, cost of scrap, process capabilities, predicted yield associated with the product etc. The benchmark learning engine module 204 may then perform an ingestion and normalization of the set of quantitative and non-quantitative inputs to produce a filtered set of information which may include deployable costs, usage of each of the product from the set of historical products, returns associated with of the product from the set of historical products in ascending order, acceptance or rejection decision for each of the product etc. The benchmark learning engine module 204 may further perform the relevant classifications of the set of filtered information in a pipelined manner in accordance with the user requirements. The benchmark learning engine module 204 may then perform a comparison and an analysis of the filtered and classified set of information obtained with the set of pre-defined system values using a set of pre-defined rules and algorithms.

Based upon the comparison and analysis, the benchmark learning engine module 204 may finally produce a final set of information on one or more relevant parameters with a set of further computed values to determine revenue potential of the plurality of IoT compatible products. For example, if the operation cost of the device 2 (similar to the any of IoT compatible product to be deployed) is 300000, the operating margin is 5 percent, the device 2 has been in use for 2 years and by over 100000 customers and the users have given information on various parts performance of the stream turbine, the benchmark learning engine module 204 may perform the comparison and analysis of the information available with respect to the device 2 using the pre-defined set of rules and algorithms and may produce an output "operational margin needs an 3 percent improvement" or "40 percent reduction in un-scheduled downtime" or "profit margin of 50000 may be expected". Therefore based upon the final set of information on one or more relevant parameters with the set of computed values the revenue potential of the IoT compatible products may be determined along with any scope to improve the revenue potential. It may be noted that the scope of the present disclosure does not restricts the computation of the revenue potential based upon the above information, data or parameters only and facilitates the computation of the revenue potential by the comparison and analysis of data ingestion and realized values from a plurality of other sources.

According to an embodiment of the present disclosure, the one or more hardware processor 104 further compute an improvement score characterizing a degree of potential improvement in integrating and deploying the plurality of IoT compatible products based on the analysis of the performance potential and the computed potential revenue value. Based on the analysis of the performance potential and the computed potential revenue value, referring to table 6, the one or more hardware processor 104 further generate or create a logical table in the memory 102 of the system 100 to compute a set of values for determining a severity of deployment of each of the IoT compatible products in the range of 1 to 10, where 1 indicates least deployment importance and 10 indicates highest deployment importance of the IoT compatible product. The severity of deployment score is indicated in column D of table 6. Similarly, a potential success and a probable failure score may be computed on the scale of 1 to 10 (as indicated in column E and F of table 3) with the score of 10 indicating the highest success rate and highest probable failure score during deployment of the IoT compatible product. Similarly, an IoT platform compatibility score may be computed on the scale of 1 to 10 where 10 denotes highest compatibility of the IoT platform to sustain, deploy and integrate any of the IoT compatible product.

According to an embodiment of the present disclosure, based upon set of values (as indicated in column D, E and F) and the computed performance and revenue potential, the IoT platform recommendation module 203 and the whitespace analyzer module 207 determine one or more optimal methods of integrating and deploying the plurality of IoT compatible products. The set of values and the computed performance and revenue potential may be For example, referring to table 6 below, the laptop has the performance potential of 7 percent of operational efficiency, and may have a profit margin of 80000 on resale and the severity deployment score, the potential success score and the probable failure score of 8, 8 and 2 respectively and a device 9 has the performance potential of 3 percent of operational efficiency, and may have a profit margin of 40000 on resale and the severity deployment score, the potential success score and the probable failure score of 7, 7 and 2 respectively, the optimal method of integrating and deploying may be arrived as "the device 7 and the device 9 and other IoT compatible products with similar sets of values and features may be deployed in a cloud architecture 'A' with at least 50 application programming interfaces (APIs) and supporting 5 or more enterprise application integrations". It may however be noted that the scope of the present disclosure does not restricts the determination of the optimal methods based upon the set of values (as indicated in column D, E and F) and the computed performance and revenue potential only and may include a plurality of other set of scores or values computed through an analysis or a comparison of sets of quantitative and non-quantitative information obtained from a plurality of other sources.

Finally based upon the comparison and analysis of the computed series of values, the performance potential, the computed potential revenue value and the analysis of the optimal methods of integrating and deploying the plurality of the IoT compatible products, the improvement score may be determined as indicated in column D of table 5 on the scale of 1 to 10 where the improvement score of 1 indicates that the IoT compatible product needs least improvement in integration and deployment while 10 indicates that the IoT compatible product needs significant improvement in integration and deployment. It may however be noted that the scope of the present disclosure does not restricts the computation of the improvement score based upon the performance potential and the computed revenue potential only and may further include computing a plurality of other scores or values based upon a plurality of other parameters or sets of information.

TABLE 5

| IoT compatible product identified for deployment (A) | Performance potential (B) | Computed Revenue potential (C) | Improvement score (D) |
| --- | --- | --- | --- |
| Device 5 | minimum 2 percent improvement in operational efficiency | profit margin of 50000 may be expected | 8 |
| Device 6 | minimum 7 percent reduction in operational efficiency | break-even point at 20000 may be expected | 7 |
| Device 7 | minimum 2 percent improvement in operational efficiency | loss at 30000 may be expected | 2 |
| Device 8 | minimum 5 percent improvement in operational efficiency | loss at 10000 may be expected | 5 |
| Device 9 | 40 percent reduction in scheduled downtime | break-even point at 60000 may be expected | 4 |
| Device 10 | 60 percent improvement in unscheduled downtime | profit margin of 20000 may be expected | 6 |
| Device 11 | 33 percent decrease in field service visits | profit margin of 10000 may be expected upon IoT deployment | 2 |
| Any other device | 15 percent reduction in a product downtime | Profit/loss or break-even expected at 20000 | 1 |

TABLE 6

| IoT compatible product identified for deployment (A) | Performance potential (B) | Computed Revenue potential (C) | Severity of deployment score (D) | Potential Success score during deployment (E) | Probable failure score if deployment fail (F) | IoT platform compatibility score (G) |
| --- | --- | --- | --- | --- | --- | --- |
| Device 7 | 7 percent in operational efficiency | profit margin of 80000 may be expected | 8 | 8 | 2 | 7 |
| Device 9 | 7 percent in operational efficiency | profit margin of 40000 may be expected | 7 | 7 | 2 | 7 |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, BLU-RAYs, flash drives, disks, and any other known physical storage media.

It is intended that the disclosure and examples be considered as exemplary only, with a true scope and spirit of disclosed embodiments being indicated by the following claims.

We claim:

1. A method for computing and evaluating Internet of Things (IoT) readiness of a product, the method comprising steps of:

obtaining, by one or more hardware processors, an initial set of information on a plurality of IoT compatible products based on a product lifecycle details stored in a memory;

generating, by the one or more hardware processors, a second set of information on a target IoT integration platform and infrastructure for configuring and connecting the plurality of IoT compatible products based on the initial set of information;

based on the second set of information performing:
  (i) generating, by the one or more hardware processors, a third set of information characterizing integration and deployment of the plurality of IoT compatible products within a current operational IoT infrastructure, wherein generating the third set of information comprises:
    (a) determining, by the one or more hardware processors, an estimated number of concurrent users to be supported by the integration and deployment of the plurality of IoT compatible products based on a comparison of the target IoT integration platform and infrastructure for configuring and connecting the plurality of IoT compatible products and a number of transaction requests to be processed by the plurality of IoT compatible products;
    (b) identifying, by the one or more hardware processors, one or more optimal methods of integrating and deploying the plurality of IoT compatible products based on a comparison of the set of assigned scores, a performance potential and a potential revenue value of the plurality of IoT compatible products; and
    (c) determining, by the one or more hardware processors, based on the analysis of the performance potential and computing the potential revenue value, an improvement score characterizing a degree of potential improvement in integrating and deploying the plurality of IoT compatible products, wherein determining the improvement score includes using the one or more optimal methods of integrating and deploying the plurality of IoT compatible products and the analysis of the performance potential and the computed potential revenue value;
  (ii) identifying, by the one or more hardware processors, the plurality of IoT compatible products comprising available capacity for an IoT integration and deployment; and
  (iii) determining, by the one or more hardware processors, a number of transaction requests to be processed by the plurality of IoT compatible products comprising available capacity for the IoT integration and deployment; and based on the initial, second and third set of information performing:

(i) computing, by the one or more hardware processors, a set of scores to be assigned to the plurality of IoT compatible products;
(ii) assigning, by the one or more hardware processors, a set of scores to the plurality of IoT compatible products for indicating a ranked order of the plurality of IoT compatible products comprising the available capacity for the IoT integration and deployment;
(iii) analyzing, by the one or more hardware processors, a new performance potential of the plurality of IoT compatible products comprising available capacity for the IoT integration and deployment based on a comparison of the assigned set of scores and a set of pre-defined system values assigned to the product lifecycle details stored in the memory; and
(iv) computing, by the one or more hardware processors, at least one potential revenue value of the plurality of IoT compatible products for optimizing potential revenue of the plurality of IoT compatible products comprising the available capacity for the IoT integration and deployment based on the set of pre-defined system values assigned to the product lifecycle details.

2. The method of claim 1, wherein the step of determining the improvement score further comprises performing, by the one or more hardware processors, a correlation of the one or more optimal methods of integrating and deploying the plurality of IoT compatible products with the analysis of the performance potential and the computed potential revenue value for performing further analysis to identify one or more alternate optimal methods of integrating and deploying the plurality of IoT compatible products.

3. A system comprising:
a memory storing instructions;
one or more communication interfaces; and
one or more hardware processors coupled to the memory via the one or more communication interfaces, wherein the one or more hardware processors are configured by the instructions to:
obtain an initial set of information on a plurality of IoT compatible products based on a product lifecycle details stored in the memory;
generate a second set of information on a target IoT integration platform and infrastructure for configuring and connecting the plurality of IoT compatible products based on the initial set of information;
based on the second set of information perform:
(i) generate a third set of information characterizing integration and deployment of the plurality of IoT compatible products within a current operational IoT infrastructure, wherein to generate the third set of information, the one or more hardware processors are further configured to:
(a) determine an estimated number of concurrent users to be supported by the integration and deployment of the plurality of IoT compatible products based on a comparison of the target IoT integration platform and infrastructure for configuring and connecting the plurality of IoT compatible products and a number of transaction requests to be processed by the plurality of IoT compatible products;
(b) identify one or more optimal methods of integrating and deploying the plurality of IoT compatible products based on a comparison of the set of assigned scores, a performance potential and a potential revenue value of the plurality of IoT compatible products; and
(c) determine an improvement score characterizing a degree of potential improvement in integrating and deploying the plurality of IoT compatible products based on the analysis of the performance potential and computing the potential revenue value, wherein determining the improvement score includes using the one or more optimal methods of integrating and deploying the plurality of IoT compatible products and the analysis of the performance potential and the computed potential revenue value;
(ii) identify the plurality of IoT compatible products comprising available capacity for an IoT integration and deployment; and
(iii) determine a number of transaction requests to be processed by the plurality of IoT compatible products comprising the available capacity for the IoT integration and deployment; and
based on the initial, second and third set of information perform:
(i) compute a set of scores to be assigned to the plurality of IoT compatible products;
(ii) assign a set of scores to the plurality of IoT compatible products for indicating a ranked order of the plurality of IoT compatible products comprising the available capacity for the IoT integration and deployment;
(iii) analyze a new performance potential of the plurality of IoT compatible products comprising available capacity for the IoT integration and deployment based on a comparison of the assigned set of scores and a set of pre-defined system values assigned to the product lifecycle details stored in the memory; and
(iv) compute at least one potential revenue value of the plurality of IoT compatible products for optimizing potential revenue of the plurality of IoT compatible products comprising the available capacity for the IoT integration and deployment based on the set of pre-defined system values assigned to the product lifecycle details.

4. The system of claim 3, wherein the one or more of the hardware processors are further configured to determine the improvement score by performing a correlation of the one or more optimal methods of integrating and deploying the plurality of IoT compatible products with the analysis of the performance potential and the computed potential revenue value for performing further analysis to identify one or more alternate optimal methods of integrating and deploying the plurality of IoT compatible products.

5. One or more non-transitory machine readable information storage mediums comprising one or more instructions which when executed by one or more hardware processors perform actions comprising:
obtaining, by the one or more hardware processors, an initial set of information on a plurality of IoT compatible products based on a product lifecycle details stored in a memory;
generating, by the one or more hardware processors, a second set of information on a target IoT integration platform and infrastructure for configuring and connecting the plurality of IoT compatible products based on the initial set of information;

based on the second set of information performing:
(i) generating, by the one or more hardware processors, a third set of information characterizing integration and deployment of the plurality of IoT compatible products within a current operational IoT infrastructure, wherein generating the third set of information comprises:
(a) determining, by the one or more hardware processors, an estimated number of concurrent users to be supported by the integration and deployment of the plurality of IoT compatible products based on a comparison of the target IoT integration platform and infrastructure for configuring and connecting the plurality of IoT compatible products and a number of transaction requests to be processed by the plurality of IoT compatible products;
(b) identifying, by the one or more hardware processors, one or more optimal methods of integrating and deploying the plurality of IoT compatible products based on a comparison of the set of assigned scores, a performance potential and a potential revenue value of the plurality of IoT compatible products; and
(c) determining, by the one or more hardware processors, based on the analysis of the performance potential and computing the potential revenue value, an improvement score characterizing a degree of potential improvement in integrating and deploying the plurality of IoT compatible products, wherein determining the improvement score includes using the one or more optimal methods of integrating and deploying the plurality of IoT compatible products and the analysis of the performance potential and the computed potential revenue value;
(ii) identifying, by the one or more hardware processors, the plurality of IoT compatible products comprising available capacity for an IoT integration and deployment; and
(iii) determining, by the one or more hardware processors, a number of transaction requests to be processed by the plurality of IoT compatible products comprising available capacity for the IoT integration and deployment; and based on the initial, second and third set of information performing:
(i) computing, by the one or more hardware processors, a set of scores to be assigned to the plurality of IoT compatible products;
(ii) assigning, by the one or more hardware processors, a set of scores to the plurality of IoT compatible products for indicating a ranked order of the plurality of IoT compatible products comprising the available capacity for the IoT integration and deployment;
(iii) analyzing, by the one or more hardware processors, a new performance potential of the plurality of IoT compatible products comprising available capacity for the IoT integration and deployment based on a comparison of the assigned set of scores and a set of pre-defined system values assigned to the product lifecycle details stored in the memory; and
(iv) computing, by the one or more hardware processors, at least one potential revenue value of the plurality of IoT compatible products for optimizing potential revenue of the plurality of IoT compatible products comprising the available capacity for the IoT integration and deployment based on the set of pre-defined system values assigned to the product lifecycle details.

6. The one or more non-transitory machine readable information storage mediums of claim 5, wherein the step of determining the improvement score further comprising performing, by the one or more hardware processors, a correlation of the one or more optimal methods of integrating and deploying the plurality of IoT compatible products with the analysis of the performance potential and the computed potential revenue value for performing further analysis to identify one or more alternate optimal methods of integrating and deploying the plurality of IoT compatible products.

* * * * *